US009122606B2

(12) United States Patent
Sundrani

(10) Patent No.: US 9,122,606 B2
(45) Date of Patent: Sep. 1, 2015

(54) METHOD AND SYSTEM FOR DISTRIBUTING TIERED CACHE PROCESSING ACROSS MULTIPLE PROCESSORS

(75) Inventor: Kapil Sundrani, Bangalore (IN)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 594 days.

(21) Appl. No.: 13/300,804

(22) Filed: Nov. 21, 2011

(65) Prior Publication Data
US 2013/0132674 A1 May 23, 2013

(51) Int. Cl.
*G06F 12/00* (2006.01)
*G06F 12/08* (2006.01)

(52) U.S. Cl.
CPC ........ *G06F 12/0804* (2013.01); *G06F 12/0862* (2013.01); *G06F 12/0866* (2013.01); *G06F 12/0875* (2013.01); *G06F 2212/214* (2013.01)

(58) Field of Classification Search
None
See application file for complete search history.

(56) References Cited

U.S. PATENT DOCUMENTS

| 7,076,636 | B1 | 7/2006 | Chilton | |
|---|---|---|---|---|
| 7,543,103 | B2* | 6/2009 | Ito | 711/103 |
| 7,581,056 | B2 | 8/2009 | Chandrasekaran | |
| 2004/0230742 | A1 | 11/2004 | Ikeuchi et al. | |
| 2005/0273560 | A1* | 12/2005 | Hulbert et al. | 711/133 |
| 2010/0011168 | A1* | 1/2010 | Ryu et al. | 711/135 |
| 2010/0115206 | A1* | 5/2010 | de la Iglesia et al. | 711/137 |
| 2010/0180081 | A1* | 7/2010 | Bose et al. | 711/122 |
| 2010/0313061 | A1* | 12/2010 | Huth et al. | 714/2 |
| 2011/0167203 | A1* | 7/2011 | Yoshida et al. | 711/103 |
| 2012/0117349 | A1* | 5/2012 | Lau et al. | 711/165 |

* cited by examiner

*Primary Examiner* — Daniel Tsui
(74) *Attorney, Agent, or Firm* — Suiter Swantz pc llo

(57) ABSTRACT

A data storage system having at least one cache and at least two processors balances the load of data access operations by directing certain processes in each data access operation to one of the processors. Each processor may be optimized for its specific processes. One processor may be dedicated to receiving and servicing data access requests; another processor may be dedicated to background tasks and cache management.

18 Claims, 4 Drawing Sheets

METHOD AND SYSTEM FOR DISTRIBUTING TIERED CACHE PROCESSING ACROSS MULTIPLE PROCESSORS

FIELD OF THE INVENTION

The present invention is directed generally toward data storage systems, and more particularly to tiered data storage systems having multiple processors.

BACKGROUND OF THE INVENTION

Performance of data storage systems depends on the relative speed of the data storage technology used to implement the system (access time), and on the processor overhead of operations to read, write and move data within the system (processing speed). To improve access time, data storage systems utilize fast memory technology to "cache" frequently accessed data. In balancing access time and cost, some data storage systems utilize stratifications of data storage technology; these stratifications are commonly referred to as "tiers." A cache may have a fast and a slow tier, and a persistent data storage device may have a fast and a slow tier. In a data storage system having a cache with a fast tier, the cache may have an access time commensurate with the processing speed such that data access operations limited to the cache do not appreciably limit the performance of the processor. In those same systems, access times for persistent data storage devices may be orders of magnitude slower, so any data access operation that includes a persistent data storage device may severely limit the performance of the processor by forcing the processor to remain idle for periods of time, and therefore unable to service data access requests.

Data storage systems may attempt to alleviate the problems caused by slow persistent data storage access time by introducing a second processor to service data access requests. In such systems, data access requests may be assigned to any processor that is not currently servicing data access requests. However, multiple processors servicing data access requests introduces the possibility that each processor may attempt to manipulate the same data, thereby requiring data integrity protection mechanisms. Also, each of the multiple processors may still be idled if multiple data access requests all require access to persistent data storage.

Consequently, it would be advantageous if an apparatus existed that is suitable for load balancing tier specific data access operations in a tiered data storage system having multiple processors.

SUMMARY OF THE INVENTION

Accordingly, the present invention is directed to a novel method and apparatus for load balancing tier specific data access operations in a tiered data storage system having multiple processors.

One embodiment of the present invention includes a data storage system having a first and a second processor, and having a cache and a data storage device. The cache may be a tiered implementation and the data storage device may be a tiered implementation. The first processor receives data access requests, such as read and write requests, and services those requests by reading from or writing to the cache. The second processor performs background tasks and services the cache by pre-fetching data that is the subject of a read request, or flushing the cache to the data storage device whenever the first processor signals the second processor accordingly, or when certain threshold conditions are met on the second processor Another embodiment of the present invention includes a third processor that reads hot spot metadata and moves data between the data storage device and the cache, or between tiers in the cache or data storage device, based on that hot spot metadata.

Another embodiment of the present invention is a method for load balancing data access operations in a data storage system having more than one processor. The method includes receiving a data access request with a first processor, performing cache specific procedures of the data access request with the first processor, and signaling a second processor to perform persistent data storage specific procedures of the data access request.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
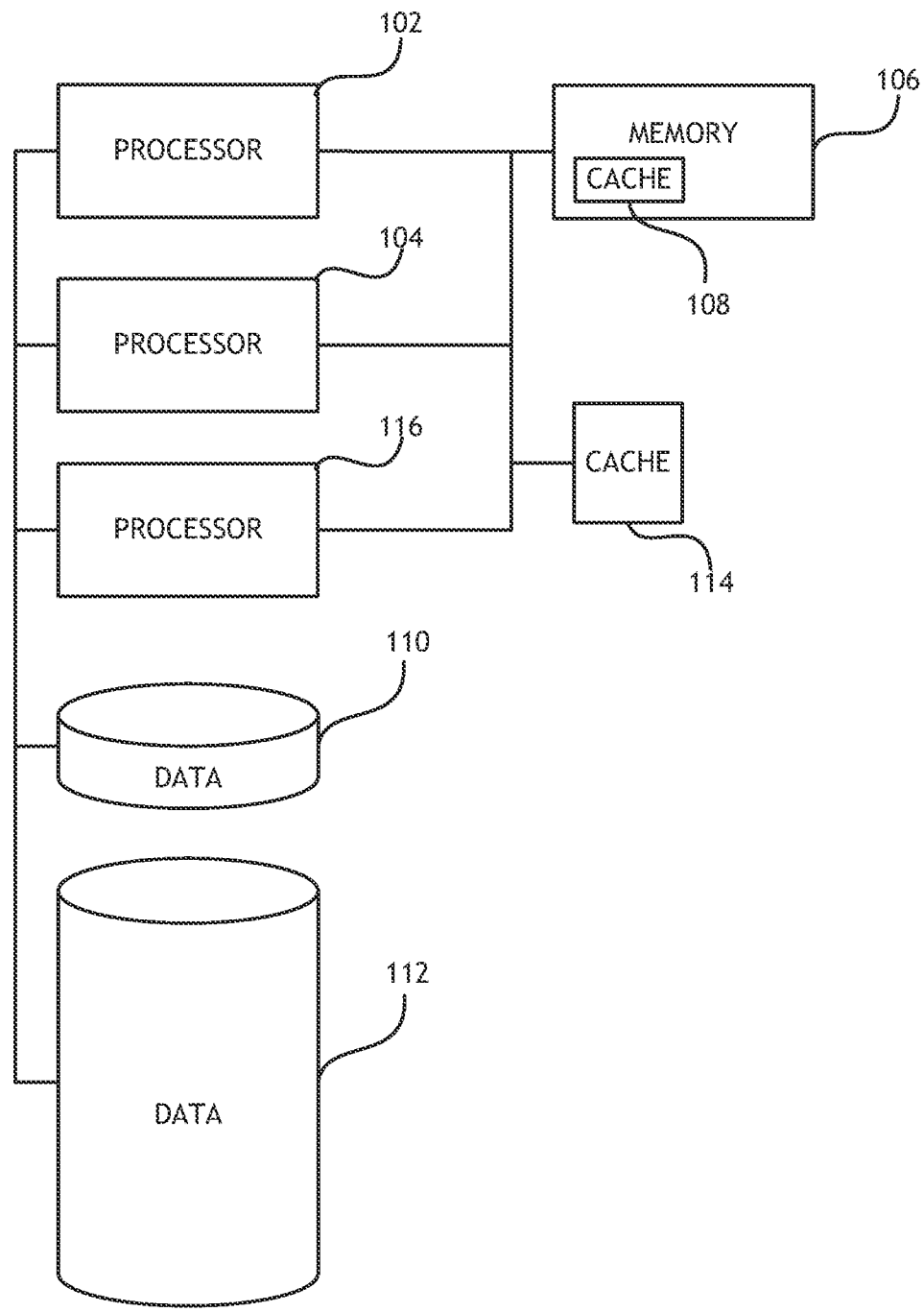
FIG. 1 shows a block diagram of a multi-processor data storage system according to the present invention.

Referring to FIG. 1, a block diagram of a multi-processor data storage system is shown. A multi-processor data storage system may include a first processor 102 and a second processor 104. One skilled in the art will appreciate that the first processor 102 and the second processor 104 may be separate processing cores in a single central processing unit (CPU), separate CPUs in a computer, CPUs in separate computers managing a single data storage system or any other configuration in which multiple processing units may interact in a data storage system. Some embodiments may include a third processor 116 as discussed further herein. The first processor 102 and second processor 104 may be connected to a memory 106 and to a slow data storage tier 112 and a fast data storage tier 110. In this exemplary embodiment, the slow data storage tier 112 may comprise a hard disk drive (HDD), an array of HDDs, or any other data storage technology otherwise consistent with the limitations set forth herein. Likewise, the fast data storage tier 110 may comprise a solid state drive (SSD) or any data storage technology provided whatever technology is used to implement the fast data storage tier 110 has faster performance characteristics (such as access time) than the technology used to implement the slow data storage tier 112. As used herein "slow" and "fast" refer only to the relative performance of the fast data storage tier 110 and the slow data storage tier 112.

Data storage technology having faster performance characteristics is generally more expensive per unit of data storage than data storage technology having slower performance characteristics. Tiered data storage systems utilize slower data storage technology to store the majority of data while utilizing faster data storage technology to store the most frequently accessed data. A tiered data storage system must monitor data access to ensure that the most frequently accessed data is stored on the fast data storage tier 110 even as data access patterns change over time. Tiered data storage systems may monitor data access by recording data access statistics (hot spot metadata) for some unit of data storage in the system. For example, data storage capacity may be divided into blocks of one megabyte each (though one skilled in the art will appreciate that one megabyte is exemplary and that data blocks may be of any size), and hotspot metadata may be recorded for each block. The most frequently accessed blocks may be stored on the fast data storage tier 110. Blocks of data may be transferred from the slow data storage tier 112 to the fast data storage tier 110, or from the fast data storage tier 110 to the slow data storage tier 112 as data access patterns change. For example: a block of data initially stored on the slow data storage tier 112 may be accessed by users more and more frequently over time. Hotspot metadata associated with that block of data may be updated every time users access the block of data. When the hotspot metadata indicates that the block of data is accessed more frequently than one or more blocks of data stored on the fast data storage tier 110, the system may move the block of data to the fast data storage tier 110 and move a less frequently accessed block of data from the fast data storage tier 110 to the slow data storage tier 112.

The multi-processor data storage system may include a cache 108, either as a portion of the memory 106 or as a separate data storage device such as flash memory. Furthermore, a multi-processor data storage system may include a tiered cache architecture wherein the system includes a fast cache 108 and a slow cache 114. In this exemplary embodiment, the slow cache 114 may comprise any memory technology otherwise consistent with the limitations set forth herein. Likewise, the fast cache 108 may comprise any data storage technology provided whatever technology is used to implement the fast cache 108 has faster performance characteristics (such as access time) than the technology used to implement the slow cache 114. As used herein "slow" and "fast" refer only to the relative performance of the fast cache 108 and the slow cache 114. Cache is generally, but not necessarily implemented with volatile memory technology as opposed to persistent data storage which is generally, but not necessarily implemented with non-volatile memory technology.

A cache 108, 114 stores a subset of data also contained in a persistent data storage such as the fast data storage tier 110 and the slow data storage tier 112. A cache 108, 114 is distinct from a storage tier in a tiered data storage system in that data stored on a tier (for example, the fast data storage tier 110) is only stored on one tier. Data stored in a cache 108, 114 is also stored in on a persistent data storage device (for example, the fast data storage tier 110 in the exemplary multi-tier data storage system). A cache 108, 114 may be implemented using any type of memory technology; for example, resistive random-access memory (RRAM) or magnetoresitive random access memory (MRAM), provided the technology used to implement the cache provides superior performance characteristics (such as access time) compared to the data storage devices 110, 112 of the data storage system. A data storage system having a cache 108, 114 may replicate frequently accessed data in the cache 108, 114. Because caches have superior performance characteristics as compared to persistent data storage, a data storage system can service data access requests faster if the data is replicated in a cache. A data storage system having a cache must monitor data access to ensure that the most frequently accessed data is replicated in the cache 108,114 even as data access patterns change over time. A data storage system may monitor data access by recording hot spot metadata for some unit of data storage in the system. For example, data storage capacity may be divided into blocks of one megabyte each (though one skilled in the art will appreciate that one megabyte is exemplary and that data blocks may be of any size), and hotspot metadata may be recorded for each block. The most frequently accessed blocks may be replicated in on the cache 108,114.

A data storage system may have a multi-tier cache with a slow cache 114 and a fast cache 108. In a system having a multi-tier cache, blocks of data may be transferred from the slow cache 114 to the fast cache 108, or from the fast cache 108 to the slow cache 114 as data access patterns change. For example: a block of data initially replicated on the slow cache 114 may be accessed by users more and more frequently over time. Hotspot metadata associated with that block of data may be updated every time users access the block of data. When the hotspot metadata indicates that the block of data is accessed more frequently than one or more blocks of data replicated on the fast cache 108, the system may move the block of data to the fast cache 108 and move a less frequently accessed block of data from the fast cache 108 to the slow cache 114.

During a write operation in a data storage system having a cache, a processor in the data storage system may determine whether date is being updated, and if data is being updated, whether the data is currently replicated in the cache. If data is replicated in the cache, the processor may acquire a region lock before transferring data to the cache to prevent other processes from altering the data during the write operation. The processor may then update the date in the cache and immediately copy the updated data to a persistent storage medium associated with the cache such as a hard drive. The processor may acquire a region lock while transferring the data to the hard drive and then update the data. When each write operation is complete, the processor may release any region locks. Write operations in a data storage system having a cache may be processor intensive. In every case where a write operation attempts to update data replicated in the cache, the processor executing the write operation must acquire locks on appropriate portions of the cache, update the data, and then to insure data integrity, acquire locks on appropriate portions of the persistent storage device and update that data.

In a data storage system having more than one processor, each processor may service data access requests, such as write operations, on an ad hoc basis. The overall data access load may be balanced between the processors as each processor may service the next data access request as the processor becomes available. Such ad hoc load balancing creates additional overhead because each processor may be constrained by the actions of each other processor. For example, where two consecutive write operations touch the same cached data, a first processor servicing the first write operation may acquire a region lock on the cached data region, thereby preventing a second processor, servicing the second write operation, from updating the cache, effectively degrading the processing capacity of the data storage system. Such restrictions are necessary to preserve data integrity, but prevent the second processor from performing other operations during the period where the first processor maintains the region lock on the cached data region.

Figure 2:
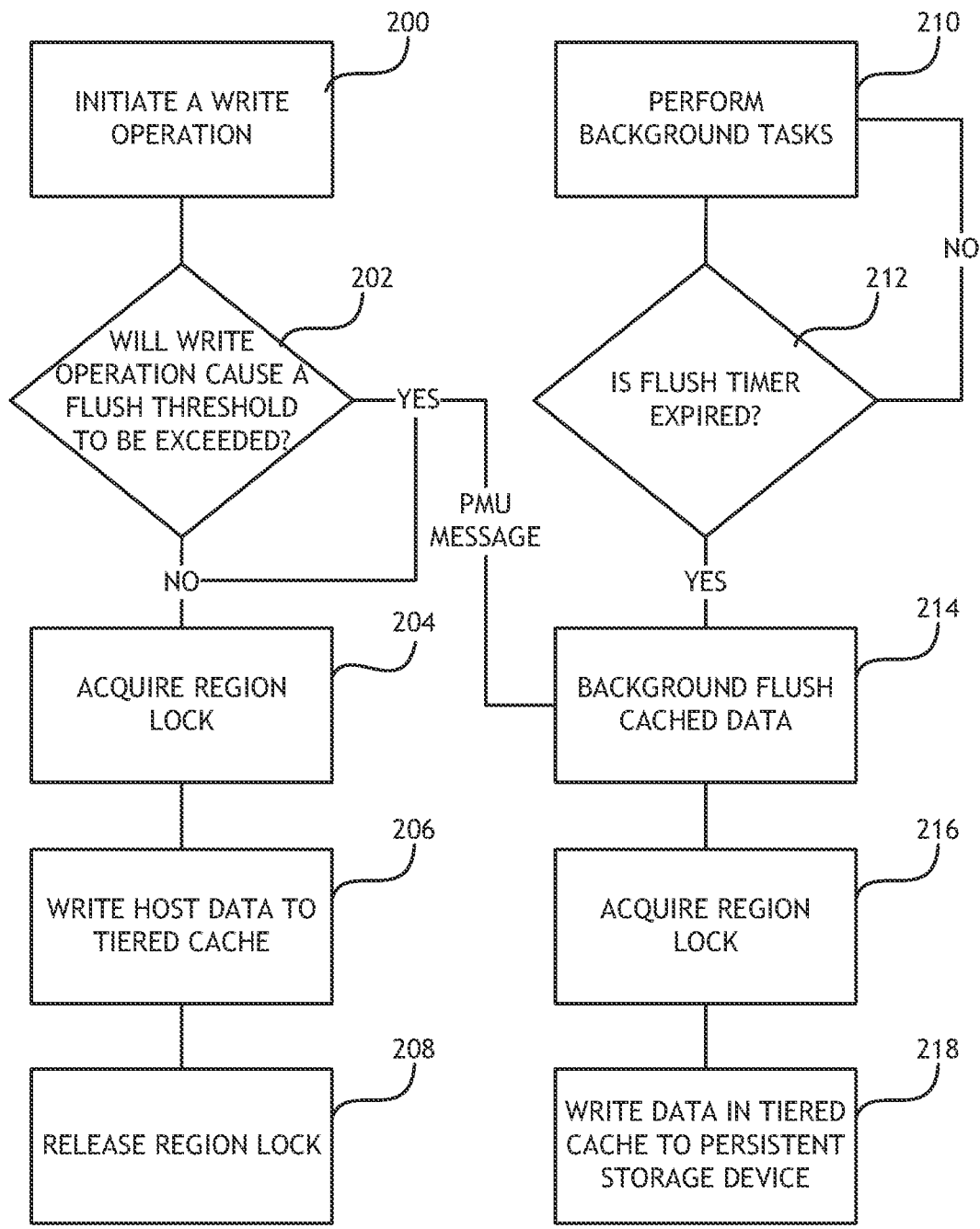
FIG. 2 shows a flowchart of a method for load balancing data write operations in a data storage system having two or more processors.

Referring to FIG. 2, a flowchart is shown for executing a write operation in a data storage system having at least one cache 108, 114 and at least two processors 102, 104. Each processor 102, 104 may be configured to execute specific steps during a data write operation, and thereby balance the processing load for each write operation between the processors 102, 104 rather than by balancing the number of write operations between the processors 102, 104; balancing the number of write operations between processors 102, 104 may require splitting system resources or having SMP safe mechanisms for managing resources. Each processor 102, 104 may be optimized for specific operations. For example: A user or process may initiate 200 a write operation. A first processor 102, or primary processor may receive all the data write operations. The first processor 102 may determine 202 if the write operation will cause a flush threshold to be exceeded. A flush threshold is a mechanism for controlling when any dirty data in cache i.e. data in cache that is not yet transferred to a persistent storage device, will be transferred to a persistent storage device. If the write operation will not exceed a flush threshold, the first processor 102 may acquire 204 a region lock on the data region, write 206 the new data to the cache, and release 208 the region lock. The first processor is then free to service the new data access request.

However, if the write operation will cause a flush threshold to be exceeded, the first processor 102 may signal a second processor 104 in the data storage system that a flush is required. The first processor 102 may then proceed as before, acquiring 204 a region lock, writing 206 the new data to the cache, and releasing 208 the region lock. Again, the first processor is free to service additional data access requests. Meanwhile, the second processor 104 may continually perform 210 various background tasks. The second processor 104 may determine 212 if a cache should be flushed to a persistent storage device based on some time interval from the last cache flush operation. Alternatively, the second processor 104 may receive a signal from the first processor 102 that a flush threshold has been exceeded and that a cache flush operation is required. The second processor 104 may then perform 214 a background flush of cached data by acquiring 216 a region lock on the data region and writing 218 the cached data to the persistent storage device.

By this method, the first processor 102 may receive and directly service all data write requests. Where all data write requests concern data in a cache, the first processor 102 may only need to execute operations on the cache. Write operations invoking a hard drive may be handled exclusively by a second processor 104, in the background. Users and processes may therefore experience improved performance because the processor directly servicing all data write requests utilizes the fastest data storage element in the data storage system.

Figure 3:
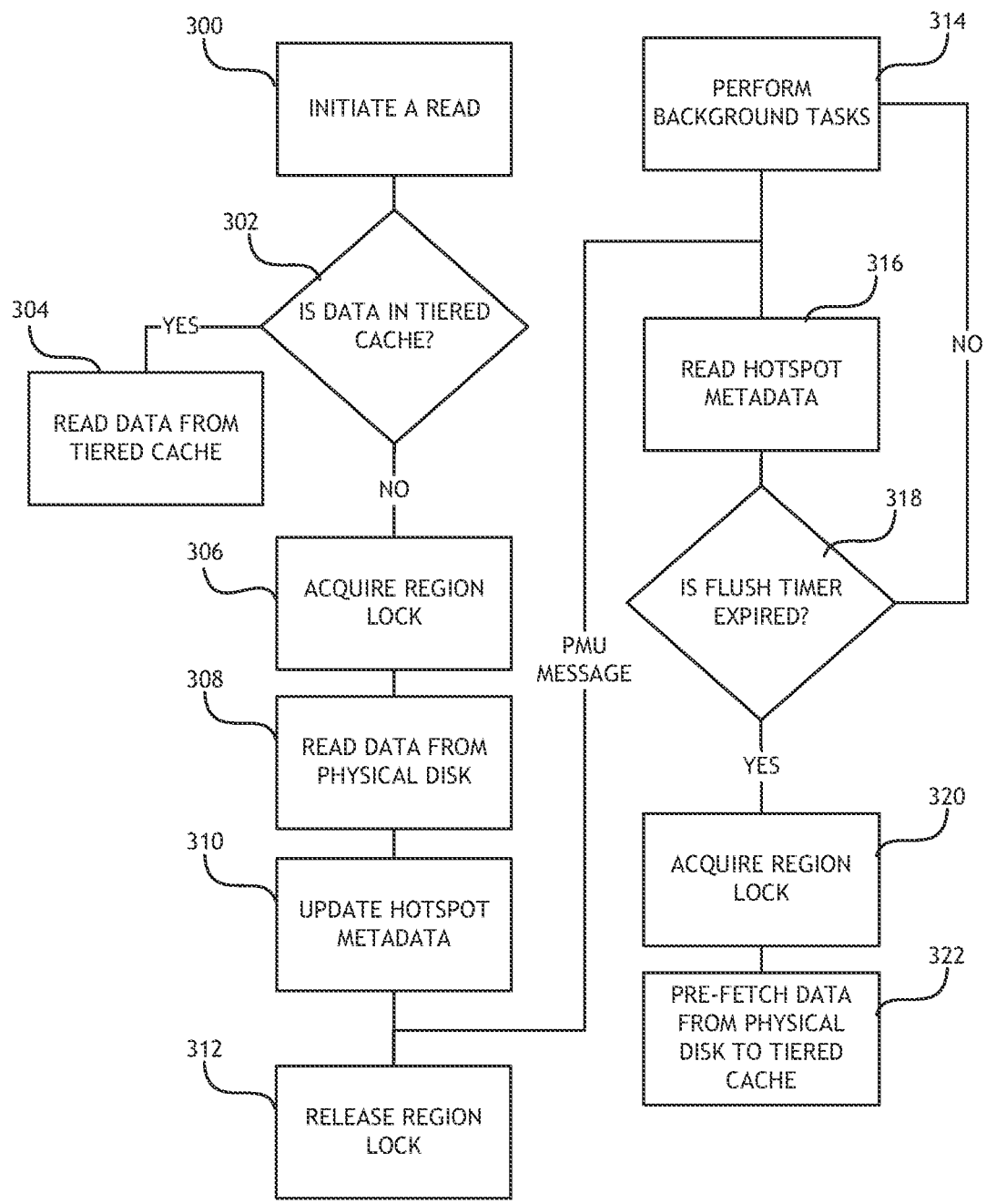
FIG. 3 shows a flowchart of a method for load balancing data read operations in a data storage system having two or more processors.

Referring to FIG. 3, a flowchart is shown for executing a read operation in a data storage system having at least one cache 108, 114 and at least two processors 102, 104. Each processor 102, 104 may be configured to execute specific steps during a data read operation, and thereby balance the processing load for each read operation between the processors 102, 104 rather than by balancing the number of read operations between the processors 102, 104; balancing the number of read operations between processors 102, 104 may require splitting system resources or having SMP safe mechanisms for managing resources. Each processor 102, 104 may be optimized for specific operations. For example: A user or process may initiate 300 a read operation. A first processor 102 may receive all the data access operations. The first processor 102 may determine 302 if the data to be read exists in the cache. If the data exists in the cache, the first processor 102 may read 304 the data from the cache and no further action is required. However, if the data does not exist in the cache, the first processor may acquire 306 a region lock on the data in a persistent storage device and read 308 the data from the persistent storage device. The first processor 102 may then update 310 hot spot metadata associated with the data or region of the persistent storage device containing the data. The first processor may then signal a second processor 104 that hot spot metadata has been updated and release 312 the region lock.

Meanwhile, the second processor 104 may continually perform 314 various background tasks, including determining 318 if a cache should be flushed to a persistent storage device based on some time interval from the last cache flush operation. The second processor 104 may receive a signal from the first processor 102 that hot spot metadata has been updated. The second processor 104 may then read 316 the hot spot metadata. If the updated hot spot metadata indicates certain data from persistent storage should be placed in cache, the second processor may acquire 320 a region lock on the data region and pre-fetch 322 the data from the persistent storage to the cache. The next read in the vicinity of pre-fetched data will be serviced directly from the cache by the first processor 102

By this method, the first processor 102 may receive and directly service all data read requests from cache. Where the data read requests concern data in a cache, the first processor 102 may only need to execute operations on the cache. Where read operations invoke a hard drive or other persistent storage device, the first processor 102 may retrieve the data and update hot spot metadata, but pre-fetching and cache management may be handled exclusively by a second processor 104, in the background. Users and processes may therefore experience improved performance because the processor directly servicing all data read requests is limited to data access operations.

In a data storage system having a tiered cache implementation, a second processor performing background tasks may move cached data from a fast cache 108 to a slow cache 114, or from a slow cache 114 to a fast cache 108 based on hot spot metadata. Likewise, in a data storage system having tiered persistent storage, a second processor performing background tasks may move data from a fast data storage tier 110 to a slow data storage tier 112, or from a slow data storage tier 112 to a fast data storage tier 110 based on hot spot metadata. Additionally, a second processor performing background tasks may replicate data from a persistent storage device to a cache 108, 114 in a tiered cache, or remove replicated data from a tiered cache based on hot spot metadata.

Figure 4:
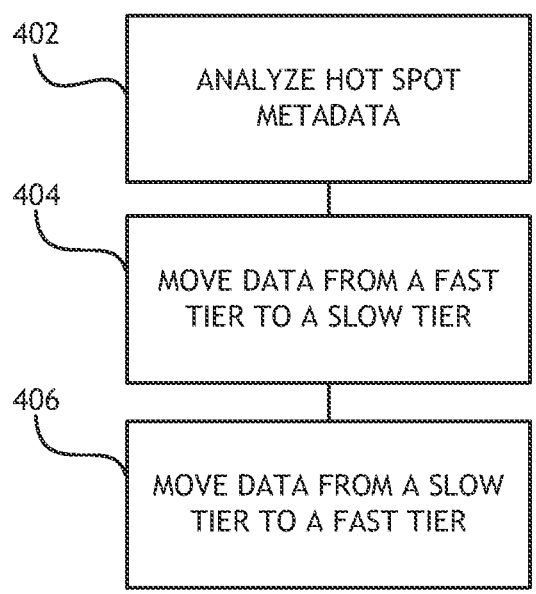
FIG. 4 shows a flowchart of a method for moving data in a tiered data storage system having a processor dedicated to moving data.

Alternatively, a data storage system may include three or more processors, where each processor is perform certain specific operations in a data access process. Referring to FIG. 4, a flowchart is shown for moving data between tiers as a background process. A third processor 116 may analyze 402 hot spot metadata and move 404 cached data from a fast cache 108 to a slow cache 114, and/or move 406 data from a slow cache 114 to a fast cache 108 based on hot spot metadata. Likewise, in a data storage system having tiered persistent storage, a third processor 116 may analyze 402 hot spot metadata and move 404 data from a fast data storage tier 110 to a slow data storage tier 112, and/or move 406 data from a slow data storage tier 112 to a fast data storage tier 110 based on hot spot metadata. Additionally, a third processor 116 may replicate data from a persistent storage device to a cache 108, 114 in a tiered cache, or remove replicated data from a tiered cache based on hot spot metadata.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A data storage system comprising:
 a first processor;
 a second processor connected to the first processor;
 a third processor connected to the first processor and the second processor;
 a read cache comprising a first cache tier and a second cache tier connected to the first processor, the second processor, and the third processor, configured to cache hot data; and
 a data storage device connected to the first processor and the second processor, said data storage device comprising a fast tier and a slow tier,
 wherein:
  the read cache is a tiered cache comprising a first cache tier and a second cache tier;
  the first processor is configured to:
   process data read requests from the read cache;
   receive a data write request;
   write data to the read cache; and
   send a signal the second processor; and
  the second processor is configured to:
   receive a signal from the first processor comprising hot spot metadata;
   move data from the slow tier to the fast tier based on the hot spot metadata; and
   flush data from the read cache to the data storage device based on the signal from the first processor; and
  the third processor is configured to:
   read cache hot spot metadata;
   analyze the cache hot spot metadata; and
   transfer data from the first cache tier to the second cache tier based on the cache hot spot metadata.

2. The data storage device of claim 1, wherein the second processor is further configured to perform background tasks.

3. The data storage device of claim 1, wherein the second processor is further configured to periodically flush the read cache to the data storage device.

4. The data storage device of claim 1, wherein the first processor is further configured to acquire a region lock on a region of the read cache to prevent access to data.

5. The data storage device of claim 1, wherein the second processor is further configured to acquire a region lock on a region of the data storage device.

6. A data storage system comprising:
 a first processor;
 a second processor connected to the first processor;
 a third processor connected to the first processor and the second processor;
 a read cache comprising a first cache tier and a second cache tier connected to the first processor, the second processor, and the third processor; and
 a data storage device, said data storage device comprising a fast tier and a slow tier, connected to the first processor and the second processor,
 wherein:
  the first processor is configured to:
   process data read requests from the read cache;
   receive a data read request;
   update hot spot metadata associated with data referenced by the data read request; and
   send a signal the second processor;
  the second processor is configured to:
   receive a signal from the first processor;
   read the hot spot metadata associated with data referenced by the data read request;
   prefetch data referenced by the data read request from the data storage device to the read cache; and
   move data from the slow tier to the fast tier; and
  the third processor is configured to:
   read cache hot spot metadata;
   analyze the cache hot spot metadata; and
   transfer data from the first cache tier to the second cache tier based on the cache hot spot metadata.

7. The data storage device of claim 6, wherein the second processor is further configured to perform background tasks.

8. The data storage device of claim 6, wherein the second processor is further configured to periodically flush the read cache to the data storage device.

9. The data storage device of claim 6, wherein the first processor is further configured to acquire a region lock on a region of the read cache.

10. The data storage device of claim 6, wherein the second processor is further configured to acquire a region lock on a region of the data storage device.

11. The data storage device of claim 6, wherein the read cache is a tiered cache comprising a first cache tier and a second cache tier.

12. The data storage device of claim 11, further comprising a third processor connected to the first processor and the second processor, wherein the third processor is configured to:
 read hot spot metadata; and
 transfer data from the first cache tier to the second cache tier.

13. The data storage device of claim 6, wherein the data storage device is a tiered storage device comprising a first storage tier and a second storage tier.

14. A method for load balancing data access transactions in a data storage system comprising a first processor, a second processor, a third processor a read cache comprising a first cache tier and a second cache tier, and a data storage device comprising a slow tier and a fast tier, such method comprising:
 receiving a data access request with the first processor;
 accessing data stored in the read cache with the first processor;
 signaling the second processor with the first processor;
 accessing data stored on the data storage device with the second processor;
 moving data from the slow tier to the fast tier with the second processor based on hot spot metadata supplied by the first processor; and transferring data from the first cache tier to the second cache tier with the third processor.

15. The method of claim 14, further comprising updating hot spot metadata with the first processor.

16. The method of claim 15, further comprising prefetching data from the data storage device to the read cache with the second processor.

17. The method of claim 15, further comprising prefetching data from the data storage device to the read cache with a third processor.

18. The method of claim 14, wherein:
the data access request is a write operation;
signaling the second processor with the first processor comprises signaling the second processor that a flush operation is required; and
accessing data stored on the data storage device with the second processor comprises flushing data from the read cache to the data storage device.

* * * * *